United States Patent Office 3,273,928
Patented Sept. 20, 1966

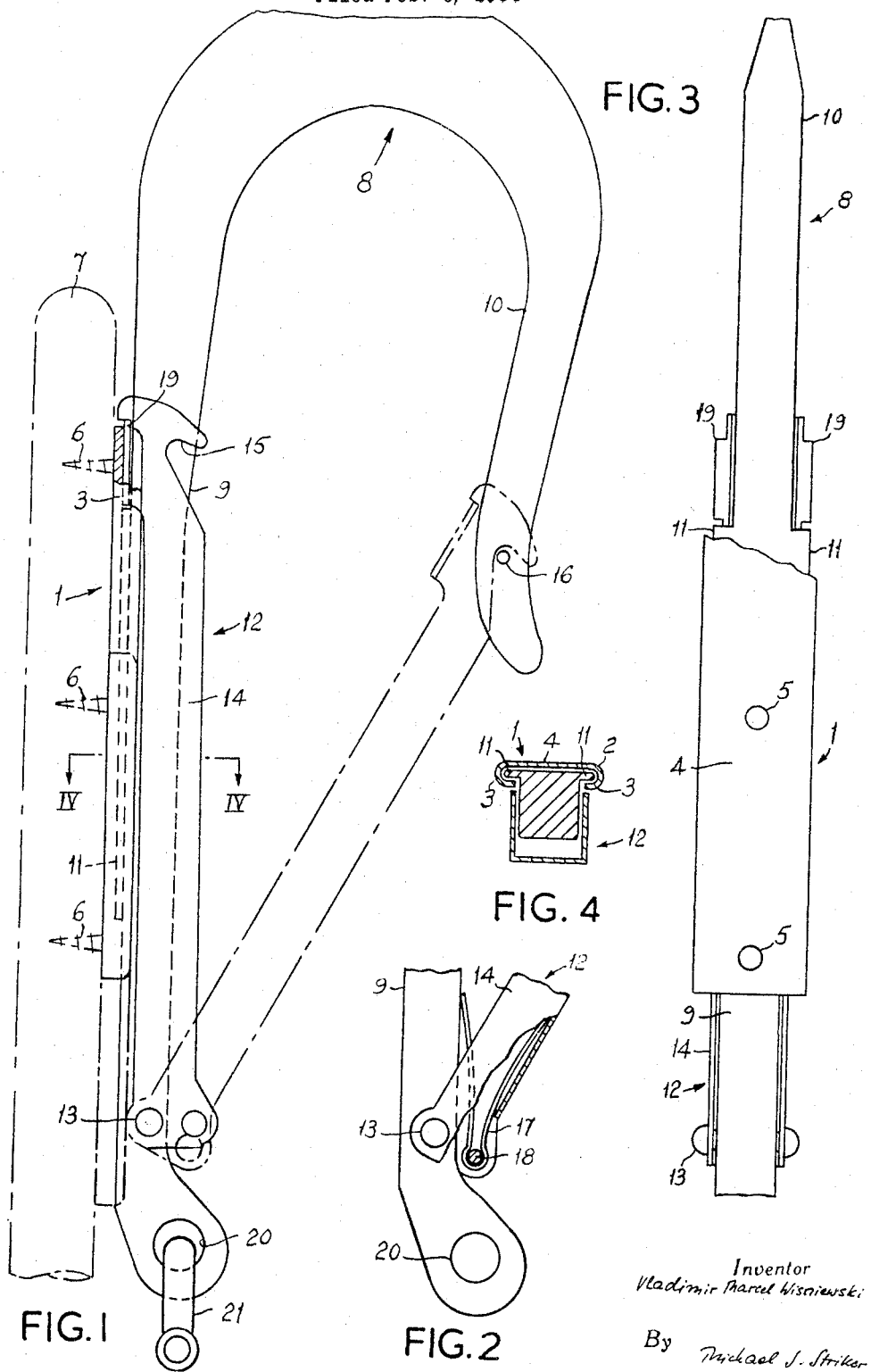

3,273,928
DEVICES FOR USE IN MOORING BOATS
Vladimir Marcel Wisniewski, Finchley, London, England, assignor to Development, Manufacture & Trade Company Limited, London, England, a British company
Filed Feb. 5, 1964, Ser. No. 342,671
6 Claims. (Cl. 294—19)

This invention relates to a mooring device for use in mooring a boat.

When mooring a boat it is known to employ a mooring hook which comprises a long wooden pole having a metal sleeve of circular cross-section permanently mounted on one end thereof, this sleeve comprising a tapered portion at or adjacent to its outwardly directed end. Removably mountable on this sleeve is a hook member comprising a shank provided with an axially disposed tapered socket of circular cross-section which is adapted to receive the tapered part of said sleeve. The entrance to the hook member is closable by a gate member which is pivotally mounted in said shank and is urged by a leaf spring into a "hook closed" position in which it extends from the shank across to the free end of the hook. The gate member is held in a withdrawn or "hook open" position by said sleeve when the latter is engaged in the shank socket. An eye is pivotally mounted at the sleeve-receiving end of the shank for the reception of a mooring rope. In use of this mooring hook to moor a boat, a length of rope is attached at one end to said eye and at its other end to the boat. The shank is then pushed on to said sleeve at the end of the pole with said gate member retained in its "hook open" position. When the boat is sufficiently close to the proposed mooring the hook member is engaged around a suitable anchorage at the mooring point, the hook member being moved to the anchorage and manoeuvred into hooking engagement therewith by means of said pole. A pull is then exerted on the pole to remove the sleeved end of the latter from the shank of the hook member. This allows said leaf spring to assert itself and move said gate member to its "hook closed" position, so that the hook member cannot become detached accidentally from its anchorage.

This known mooring hook has several disadvantages. In the first place the tapered sleeve and tapered socket are expensive to manufacture and they must be carefully protected from damage, otherwise there will be a risk of the sleeve and shank jamming together when assembled. If such jamming occurs it can be a difficult and possibly hazardous job to separate the pole from the hook member. Another disadvantage is that the mooring hook is only of use for the specific operation of mooring a boat and has no useful purpose at other times. The presence of the sleeve at one end of the pole prevents the mounting of other equipment, for example a boat hook, at that end, and it would be dangerous to fix other equipment at the other end of the pole, where it might cause injury to a person using the pole during the mooring of a boat.

According to the present invention a mooring device comprises a base member, a hook, interengaging means on the peripheral surface of the shank of the hook and the base member enabling the base member to be removably engaged on the side of the shank by a sliding movement in a direction substantially parallel to the axis of the shank, a gate member mounted on the shank and pivotable between an open position in close proximity to said shank and a closed position in which the free end of the gate member engages the free end of the hook, spring means urging the gate member to its closed position, and means on the gate member and the base member interengageable in the open position of the gate member for retaining the latter in its open position in opposition to the force of said spring means, the arrangement of the various interengaging means being such that sliding movement of the base member relative to the hook to disengage these two parts results in the freeing of said gate member prior to the separation of the hook and base member.

The base member may be permanently mounted on a pole, but preferably it is adapted to be removably mounted on a pole. For example, the base member may be provided with suitably positioned holes serving for the reception of screws which secure the base member to the peripheral surface of a pole adjacent to one end thereof. In this way the end of the pole adjacent to the base member is left free and may receive other equipment, for example a boat hook.

One form of mooring device in accordance with the invention will now be described, by way of example, with reference to the accompanying drawing, in which:

FIGURE 1 is a partly sectioned side elevation of the device,

FIGURE 2 is a partly sectioned side elevation of a part of the device of FIGURE 1 with the gate member in closed position, FIGURE 3 is an end elevation of part of the device of FIGURE 1, and FIGURE 4 is a cross-section taken on the line IV—IV of FIGURE 1.

The mooring device shown in the drawing comprises a base member, generally designated by the numeral 1, which consists of a parallel-sided strip 2 of metal having its opposite longitudinal edges 3 curled over towards each other in parallel spaced relationship from the centre portion 4 of the strip, the overall width of the base member being about 1 inch and the inwardly directed edges 3 being spaced about ½ inch apart.

Three holes 5 are drilled through the central portion 4 for the reception of screws 6 serving to secure the base member to a convenient portable support, for example a wooden pole 7 (shown in chain lines in FIGURE 1 only). The strip 2 may have a length of about 4 inches.

The mooring device also comprises a hook generally designated by the numeral 8. The hook 8 has a straight solid shank 9 of square cross-sectional shape and a hook portion 10. The shank is provided with flanges 11 on two opposite sides thereof. These flanges may be formed integrally with the shank 9 or by a flat, parallel-sided metal strip secured, for example brazed, riveted or welded, to one side surface of the shank 9 with the longitudinal axis of the strip parallel to the longitudinal axis of the shank. The flanges 11 are disposed in a plane substantially at right angles to the plane of the hook portion 10. The flanged part of the shank has a length of about 3½ inches and a width of 1³⁄₁₆ inch, the main body of the shank being ½ inch square.

A gate member, generally designated by the numeral 12 and formed from substantially U-section metal strip, is pivoted to the shank 9 adjacent to the end of the latter remote from the hook portion 10. The pivoting axis 13 of the gate member 12 passes through the shank at right angles to the plane of the hook portion 10 and through the sides 14 of the U-section of the gate member. The gate member 12 can pivot between an open position (shown in full lines in FIGURE 1), in which it is disposed parallel to the shank 9 with its sides 14 embracing the shank, and a closed position (shown in chain lines in FIGURE 1) in which it is inclined to the shank 9 with its free end engaging the hook portion 10 close to the free end of the latter. As groove 15 is cut in the free end of the gate member 12, which groove, in the closed position of the gate member, engages a pin 16 passing through the hook portion 10, adjacent to the free end of the latter, at right angles to the plane of the hook portions.

A two-armed leaf spring 17, mounted on a pin 18 in the gate member 12, has one arm bearing against the shank 9 and its other arm bearing against the inside of the gate member 12 between the sides 14, and urges the gate member 12 to its closed position (see FIGURE 2).

Close to its free end the gate member 12 has two outwardly directed flanges 19 on the sides 14, the flanges 19 being disposed parallel to the longitudinal axis of the gate member 12. In the open position of the gate member the two flanges 19 are aligned with the two flanges 11 on the shank 9, the distance between the outwardly directed edges of the flanges 19 being about 13/16 inch.

At its remote end from the hook portion 10, the shank 9 comprises a fixed eye 20.

In use of the above described mooring device a piece of rope (not shown) of suitable length is attached at one end to the eye 20 by means of a conventional shackle 21 and at its other end to the boat (not shown) being moored. The base member 1, secured to its pole 7, is then slide on to the shank 9 with the flanges 11 received in the curled over edges 3 of the base member. When the leading end of the base member 1 has been slid right along the flanges 11, the gate member 12 is moved to its open position, in opposition to the action of the leaf spring 17, to bring the flanges 19 of the gate member into alignment with the flanges 11. The base member 1 is then pushed further along the shank 9 so that its leading end passes off the flanges 11 and receives the flanges 19 between its curled over edges 3, so retaining the gate member 12 in its open position.

When the hook 8 has been engaged around a suitable anchorage, the pole 7 is pulled away from the hook. This causes the base member 12 to be withdrawn from the shank 9 in the opposite direction to that in which it was mounted on the shank. Consequently, the flanges 19 of the gate member are first released by the base member, so that the leaf spring 17 can assert itself and move the gate member 12 to its closed position, and then the base member slides off the flanges 11 on the shank.

Since the hook 8 is mounted at the side of the pole 7 during use of the mooring device, it will be appreciated that other equipment, for example a boat hook (not shown) may be mounted on the end of the pole, so that the pole can be usefully employed at times other than during the mooring of a boat. Another advantage of the side mounting of the hook 8 is that the eye 20 which receives the shackle 21 can be fixedly mounted to the end of the shank 9, whereas in the previously known mooring hook the eye was pivotally mounted so that it could pivot into alignment with the hook shank after withdrawal of the pole from the tapered socket in the shank.

It will, of course, be appreciated that the invention is not limited to the particular form of mooring device described in detail above. Thus, for example, the base member may comprise outwardly directed flanges which are engageable in grooves formed in the surface of the hook shank and in the gate member.

What is claimed is:

1. A mooring device or the like, comprising an elongated support having an end; an elongated socket member secured to said support adjacent said end and having a pair of longitudinally extending grooves; a hook having a hook element and an elongated shank portion of substantially square cross-section, said shank portion having a pair of spaced flanges projecting in a common plane and slidably receivable in said grooves; a gate member movably secured to said shank portion so as to be shiftable between a locking position in which it engages a free end portion of said hook element and an open position in which said gate member is spaced from said free end portion, said gate member having a U-shaped cross-section and in said open position partly surrounding said shank portion; and cooperating retaining means on said socket member and said gate member for maintaining the latter in said open position when said flanges are received in said grooves.

2. A mooring device as recited in claim 1, wherein said gate member is secured to said shank portion with one end and has an opposite free end, and wherein said retaining means comprises a pair of flanges projecting from said free end of said gate member in a common plane and receivable in said grooves of said socket member when said gate member is in said open position.

3. A mooring device as recited in claim 2, further comprising spring means biasing said gate member to said closed position.

4. A mooring device as recited in claim 2, wherein said gate member is pivotable between said open and said closed positions.

5. A mooring device or the like, comprising an elongated socket having at least one open groove extending in longitudinal direction of said socket; a hook having a hook element, and an elongated shank having at least one main flange slidably receivable in said open groove so as to mount said hook on said elongated socket slidable relative to said socket in longitudinal direction thereof, said hook being adapted to be detached from said socket by sliding of said main flange out of one end of said groove; a gate secured to said shank movably between a locking position located near to the free end of said hook and an open position located adjacent to said elongated socket; and an additional flange on said gate adapted to engage said open groove between said main flange and said one end of said groove so as to hold said gate in said open position thereof, said additional flange sliding out of said open groove before said main flange during sliding of said flanges towards said one end of said groove so that said additional flange becomes detached from said elongated socket and thus said gate is free to move into said locking position thereof while said hook is still attached to said elongated socket by said main flange sliding in said open groove.

6. A mooring device or the like according to claim 5, wherein said elongated socket has two parallel open grooves extending in longitudinal direction of said socket, said shank has two main flanges and said gate has two additional flanges adapted to engage and slide in said grooves.

References Cited by the Examiner

FOREIGN PATENTS 223,726 10/1924 Great Britain.

GERALD M. FORLENZA, *Primary Examiner.*

SAMUEL F. COLEMAN, *Examiner.*

G. F. ABRAHAM, *Assistant Examiner.*